No. 829,768. PATENTED AUG. 28, 1906.
T. F. DIXON.
MACHINE FOR FORMING PRINTERS' RULES.
APPLICATION FILED JULY 7, 1905.
3 SHEETS—SHEET 1.
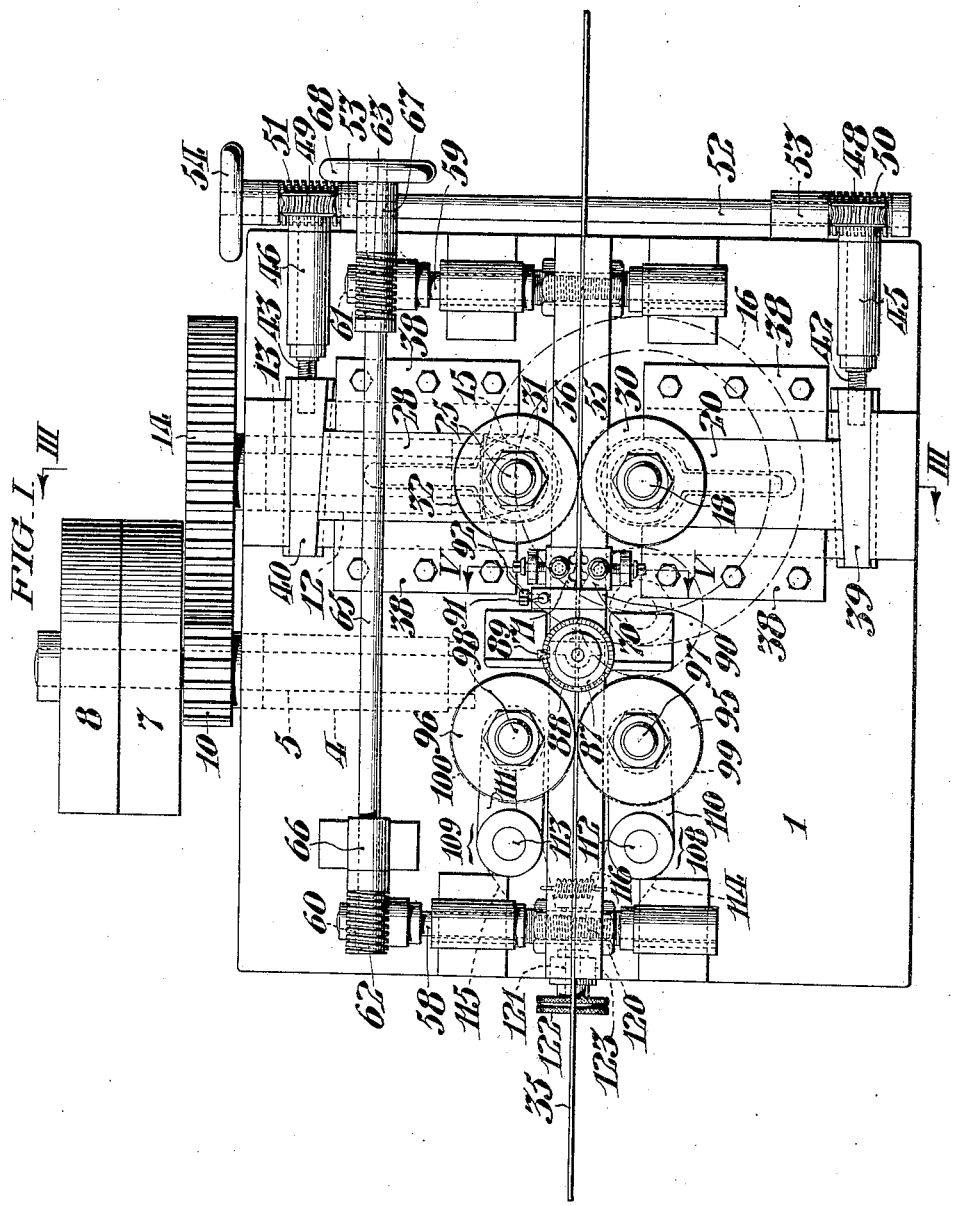
WITNESSES:
Clifton C. Hallowell
John E. Bergner
INVENTOR:
THOMAS F. DIXON,
by Paige, Paul & Foley
Attys.

No. 829,768. PATENTED AUG. 28, 1906.
T. F. DIXON.
MACHINE FOR FORMING PRINTERS' RULES.
APPLICATION FILED JULY 7, 1905.
3 SHEETS—SHEET 2.
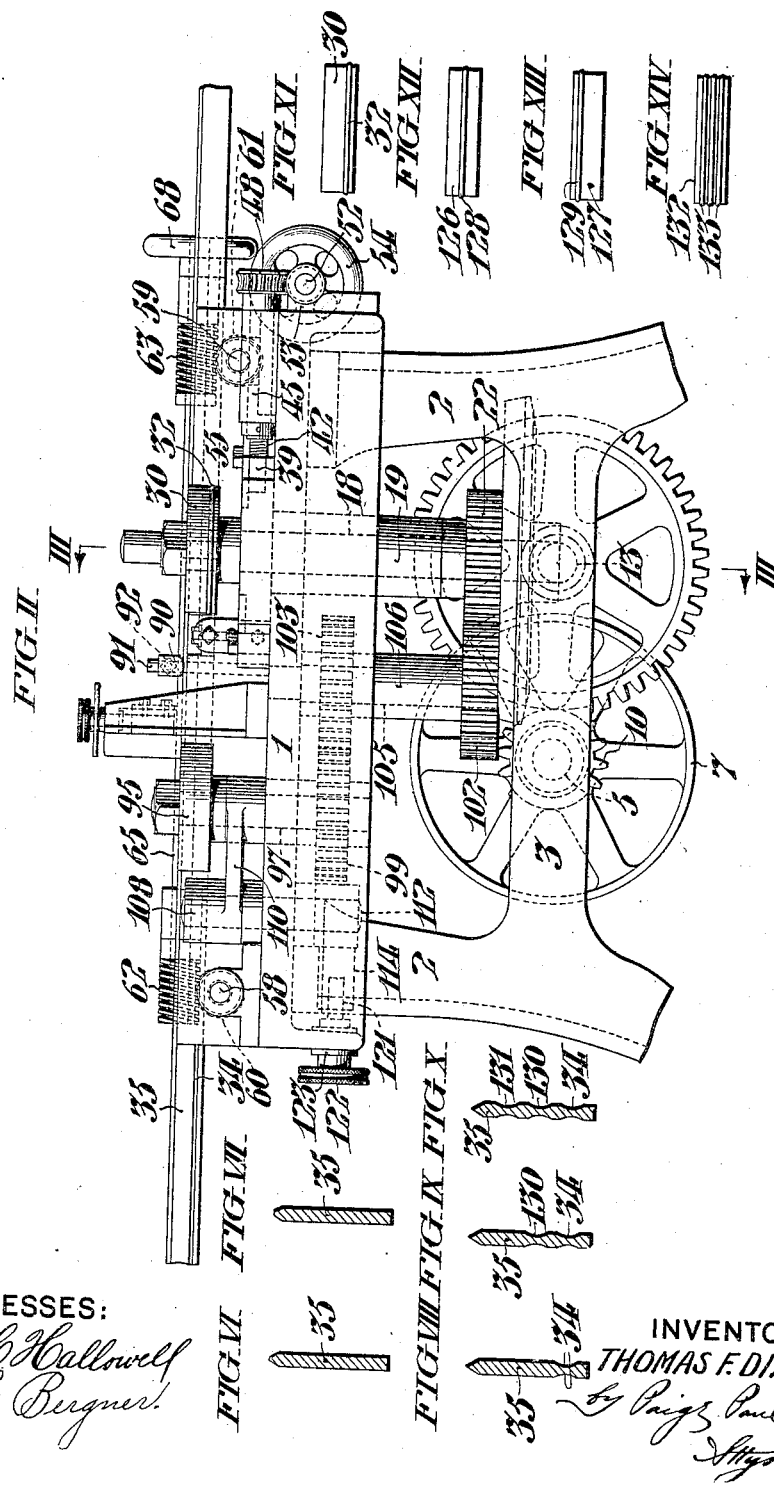
WITNESSES:
INVENTOR:
THOMAS F. DIXON, No. 829,768. PATENTED AUG. 28, 1906.
T. F. DIXON.
MACHINE FOR FORMING PRINTERS' RULES.
APPLICATION FILED JULY 7, 1905.
3 SHEETS—SHEET 3.
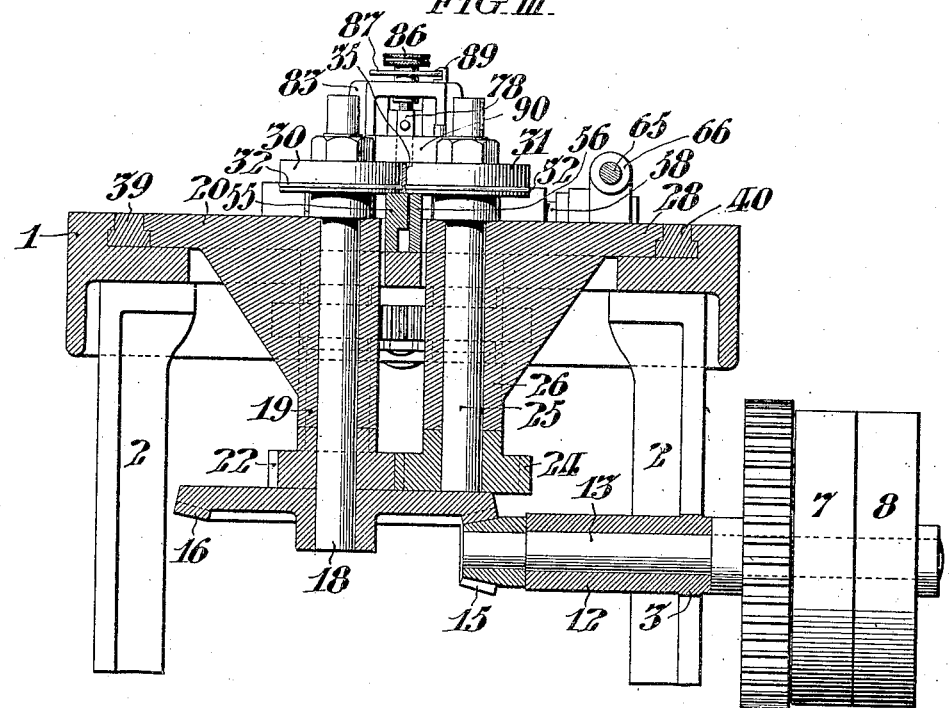
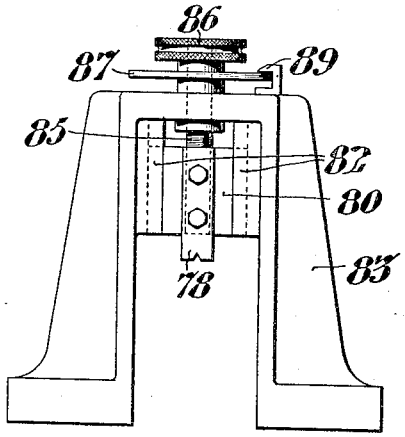
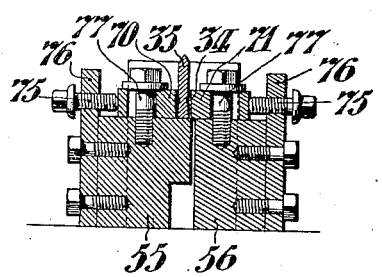
WITNESSES:
Clifton C. Hallowell
John C. Bergner
INVENTOR:
THOMAS F. DIXON,
by Paige, Paul & Foley.
Attys.

UNITED STATES PATENT OFFICE.

THOMAS F. DIXON, OF PHILADELPHIA, PENNSYLVANIA.

MACHINE FOR FORMING PRINTERS' RULES.

No. 829,768.  Specification of Letters Patent.  Patented Aug. 28, 1906.

Application filed July 7, 1905. Serial No. 268,601.

*To all whom it may concern:*

Be it known that I, THOMAS F. DIXON, of Philadelphia, in the State of Pennsylvania, have invented certain new and useful Improvements in Machines for Forming Printers' Rules, whereof the following is a specification, reference being had to the accompanying drawings.

My improvements relate to a machine whereby a printer's rule may be formed and re-formed and its period of usefulness thus prolonged after it would under ordinary circumstances be assigned to scrap.

The form of my invention herein described comprises rollers having beads arranged to roll grooves in the sides of a printer's rule parallel with the printing edge thereof, whereby the height of the rule is increased without changing the effective thickness thereof, trimming-tools arranged to remove the bur formed by the rolling of said grooves, a shaping-tool arranged to trim the printing edge of said rule, means for propelling said rule, and means arranged to independently adjust said rollers and said tools with respect to said rule.

My invention further includes the various novel features of construction and arrangement hereinafter more definitely specified.

In the accompanying drawings, Figure I is a plan view of a machine conveniently embodying my invention. Fig. II is a side elevation of said machine. Fig. III is a transverse vertical sectional view of said machine, taken on the line III III in Figs. I and II. Fig. IV is an enlarged detail view of the edge-trimming mechanism. Fig. V is an enlarged sectional view of the side-trimming mechanism, taken on the line V V in Fig. I. Fig. VI is an enlarged cross-section of a printer's rule. Fig. VII is an enlarged cross-section of a printer's rule, showing a nick in its printing edge. Fig. VIII is an enlarged cross-section of a re-formed rule. Fig. IX is an enlarged cross-section of a rule after its second re-forming. Fig. X is an enlarged cross-section of a rule after its third re-forming. Figs. XI, XII, XIII, and XIV are side elevations of different forms of rollers.

In said drawings, the bed-plate 1 is conveniently supported upon the legs or standards 2, two of which are joined by the web 3, having the bearing 4 for the driving-shaft 5. Said shaft 5 is provided with the usual tight and loose pulleys 7 and 8 and the pinion 10. The web 3 also comprises the bearing 12 for the counter-shaft 13, which is provided with the gear 14 and the bevel-pinion 15, the former being in mesh with the pinion 10 and the latter in mesh with the bevel-gear 16 on the vertical shaft 18. Said vertical shaft 18 is journaled in the bearing 19 in the slide-block 20 and has the gear 22 in mesh with the gear 24 on the vertical counter-shaft 25, which is journaled in the bearing 26 in the slide-block 28. The shafts 18 and 25 are respectively provided with the removable rollers 30 and 31, having beads 32 on their peripheries arranged to roll grooves 34 in the sides of the printer's rule 35, as best shown in Figs. III and V. It will be here noted that said rollers 30 and 31 may be provided with one of more beads arranged to roll grooves in the rule 35.

As before stated, the shafts 18 and 25 of the respective rollers 30 and 31 are journaled in the respective slide-blocks 20 and 28, said blocks being arranged to slide between the guides 38, which are adapted to be moved together by the wedge-blocks 39 and 40. Said wedge-blocks are respectively in threaded engagement with the adjusting-shafts 42 and 43 and are journaled in the bearings 45 and 46 and provided with the worm-gears 48 and 49, in threaded engagement with the worms 50 and 51 on the shaft 52, which latter is journaled in the bearings 53 and provided with the hand-wheel 54, by which it may be rotated to adjust the rollers 30 and 31 with respect to the rule.

The rule 35 is guided through the machine between the guides 55 and 56, which are mounted on the bed-plate 1 and arranged to be adjusted toward and away from each other to accommodate rules of different thicknesses by their threaded engagement with the adjusting-shafts 58 and 59, which are respectively provided with the worm-gears 60 and 61, arranged to be rotated by the respective worms 62 and 63 on the shaft 65, mounted for rotation in the bearings 66 and 67 and having the hand-wheel 68. Said shafts 58 and 59 are each provided with right and left hand threads arranged to engage corresponding right and left hand threads in the respective guides 56 and 55, so that when the shafts 58 and 59 are rotated said guides are contemporaneously shifted toward or away from each other, depending on the direction of rotation of said shafts. As the rule 35 emerges from between the rollers 30 and 31 it passes between the side-trimming tools 70 and 71, which are arranged to trim the bur (formed by the rolling of the groove 34) from the sides of the rule. The tools 70 and 71 are arranged to be adjusted by the adjusting-screws 75, which are in threaded engagement with the plates 76, (best shown in Fig. V,) and said tools are respectively secured to the guides 55 and 56 by the set-screws 77, which pass through slots in said tools 70 and 71 and which are in threaded engagement with said guides. Said rule 35 next encounters the edge-shaping tool 78, (best shown in Fig. IV,) where its printing edge is trimmed V-shaped, as best shown in Fig. V. Said tool 78 is secured to the cross-head 80, which is arranged for vertical adjustment in the guides 82, formed in the yoke 83, and said cross-head being in threaded engagement with the adjusting-screw 85 may be shifted to any desired position by the rotation of said screw 85, which is provided with the knurled hand-wheel 86, by which it may be rotated. As a delicate adjustment of the tool 78 is desirable, the disk 87, having the graduations 88, is secured to the screw 85 and arranged to be rotated with respect to the pointer or indicator 89, which is secured to the yoke 83, whereby the operator may definitely determine the desired position of said tool 78. To prevent the accidental uplifting of the end of the rule 35 as it is about to enter beneath the edge-trimming tool 78, which uplifting might be destructive to said tool, the guide-block 90 is provided, which extends over the path of the rule and which is adjustably secured to the vertical post 91 by the set-screw 92. The rollers 95 and 96 are arranged to continue the progression of the rule 35 after it leaves the rollers 30 and 31 and are conveniently mounted on the respective shafts 97 and 98, which are provided with the gears 99 and 100, meshing with each other, the former being driven by the gear 22 through the idlers 102 and 103 on the idler-shaft 105, which is journaled in the bearing 106.

The shafts 97 and 98 are mounted for rotation in the pivoted frames 108 and 109, which respectively comprise the levers 110 and 111 above the bed-plate 1, the rock-shafts 112 and 113, extending through and journaled in said bed-plate, and the levers 114 and 115, secured to said rock-shafts beneath said bed-plate and normally drawn together by the coiled spring 116. The levers 114 and 115 are arranged to be forced apart against the tension of the spring 116 by the wedge-block 120, which is in threaded engagement with the adjusting-screw 121, having the knurled hand-wheel 122, by which it may be rotated in its bearing 123. The shifting of said wedge-block 120 inward forces the rollers 95 and 96 toward the rule 35, which may be engaged with any desired degree of pressure determined by the rotation of the shaft 121.

When it is desired to re-form a printer's rule which has been condemned by reason of its printing edge becoming nicked, the machine being properly adjusted may be equipped with rollers, such as shown in Fig. II, and the worn or condemned rule run through between the guides 55 and 56 and rollers 30 and 31. The beads 32 on said rollers form a groove on each side of said rule, and thereby increase its height to such an extent that the nicked V-shaped edge is trimmed by the tool 78, and the nicks thereby eliminated and the rule delivered by the rollers 95 and 96 from the machine in the form shown in cross-section in Fig. VIII.

It will be noted that the operation may be repeated as many times as there is space on said rule to roll grooves and that the rollers 30 may be replaced by rollers 126 or 127, having respective beads 128 and 129 in different locations on their peripheries, as shown in Figs. XII and XIII, to roll respective grooves 130 and 131 at different heights on the rule, as shown in Figs. IX and X.

A roller 132, such as shown in Fig. XIV, which is provided with a plurality of beads 133, may be continuously used without removing it from the machine, in which event in the first re-forming of the condemned rule the said rollers engage it with a minimum pressure to roll a plurality of relatively slight horizontal depressions in its sides and at the second re-forming said depressions may be deepened by being rolled with a greater degree of pressure, and so on until a maximum depth of the depressions has been reached.

I do not desire to limit myself to the precise details of construction and arrangements herein set forth, as it is obvious that various modifications may be made therein without departing from the essential features of my invention.

I claim—

1. In a machine of the class described, the combination with a feeding device comprising rollers having means arranged to increase the height of a printer's rule by distorting it; of a shaping-tool comprising angularly-disposed cutting edges arranged to sharpen said distorted rule, which is shifted into coöperative relation therewith by said feeding device, substantially as set forth.

2. In a machine of the class described, the combination with a feeding device comprising rollers having means arranged to increase the height of a printer's rule by distorting it, of means comprising adjustable bearings arranged to vary the impact of said rollers whereby the extent of said distortion is determined; and a shaping-tool arranged to trim the printing edge of said distorted rule, which is shifted in coöperative relation therewith by said feeding device, substantially as set forth.

3. In a machine of the class described, the combination with a feeding device comprising rollers having means arranged to increase the height of a printer's rule by distorting it; of a shaping-tool arranged to trim said distorted rule, which is shifted in coöperative relation therewith by said feeding device; guides arranged to direct said rule, into engagement with said shaping-tool; and means arranged to contemporaneously shift said rollers with respect to said guides whereby the extent of distortion is determined, substantially as set forth.

4. In a machine of the class described, the combination with a shaping-tool; of rollers arranged to shift a printer's rule in operative relation with said tool; and means carried by said rollers arranged to indent said rule to distort it intermediate of its edges, and thereby separate said edges without destroying their original form, substantially as set forth.

5. In a machine of the class described, the combination with a shaping-tool; of feeding-rollers arranged to shift a printer's rule in operative relation with said tool; beads on said rollers arranged to form grooves in said rule intermediate of its edges, whereby the height of said rule is increased without destroying the form of its edges, substantially as set forth.

6. In a machine of the class described, the combination with a shaping-tool; of feeding-rollers arranged to shift a printer's rule in operative relation with said tool; means carried by said rollers arranged to form grooves in the sides of said rule to distort it; and thereby increase its height; means arranged to contemporaneously adjust said rollers, in opposite directions, to determine the height to which said rule is distorted with respect to said shaping-tool, substantially as set forth.

7. In a machine of the class described, the combination with guides arranged to direct a printer's rule; means arranged to adjust said guides with respect to said rule; a shaping-tool; means arranged to adjust said tool; feeding-rollers arranged to shift said rule in operative relation with said tool; means carried by said rollers arranged to indent said rule to distort it and thereby increase its height; and, means arranged to adjust said feeding-rollers, substantially as set forth.

8. In a machine of the class described, the combination with a shaping-tool; of feeding-rollers arranged to shift a printer's rule in operative relation with said tool; means arranged to direct said rule in alinement with said tool; means carried by said rollers arranged to form grooves in the sides of said rule to distort it, and thereby increase its height; and means arranged to adjust said tool with respect to said directing means, and thereby determine the height of said rule when shaped, substantially as set forth.

9. In a machine of the class described, the combination with a shaping-tool; of feeding-rollers arranged to shift a printer's rule in operative relation with said tool; guides arranged to direct said rule in alinement with said tool; means carried by said rollers arranged to form grooves in the sides of said rule to distort it, and thereby increase its height; means arranged to adjust said tool with respect to said guides, and thereby determine the height of said rule when shaped; and means carried by said guides arranged to trim the bur formed by rolling said grooves, substantially as set forth.

10. In a machine of the class described, the combination with a shaping-tool; of feeding-rollers arranged to shift a printer's rule in operative relation with said tool; guides arranged to direct said rule into operative engagement with said tool; means arranged to contemporaneously adjust said guides to respectively engage the opposite sides of said rule; means carried by said rollers arranged to form guides in said rule to distort it, and thereby increase its height; means arranged to adjust said rollers, whereby the extent of distortion is determined; means arranged to adjust said tool with respect to said rule, to determine the height of said rule when shaped; and adjustable trimming-tools carried by said guides arranged to trim off the bur incident to the forming of said grooves, substantially as set forth.

11. In a machine of the class described, the combination with an adjustable shaping-tool; means arranged to shift a printer's rule in operative relation with said tool; a dial-plate arranged to rotate in definite relation with the adjustment of said tool; and a pointer for said plate arranged to indicate, on said plate, the amount of adjustment of said tool whereby the height to which said rule is to be trimmed is determined, substantially as set forth.

12. In a machine of the class described, the combination with a shaping-tool; of feeding-rollers forward of said tool arranged to shift a printer's rule, into operative engagement with said tool; means carried by said rollers arranged to indent said rule and thereby increase its height sufficiently to engage said tool; and rollers rearward of said tool arranged to rotate synchronously with said feeding-rollers whereby the shaped rule is drawn from said tool at a uniform speed, substantially as set forth.

13. In a machine of the class described, the combination with an adjustable shaping-tool; of feeding-rollers arranged to shift a printer's rule in operative relation with said tool; an indicating device respectively connected with said tool comprising means whereby the extent of adjustment of the latter is manifest, substantially as set forth.

14. In a machine of the class described, the combination with rollers between which a printer's rule is progressed; beads on said rollers arranged to form grooves in said rule, to distort it and thereby increase its height; shafts for said rollers; slide-blocks having bearings for said shafts; guides for said blocks; wedge-blocks arranged to shift said slide-blocks; shafts arranged to be contemporaneously rotated to shift said wedge-blocks, and thereby simultaneously adjust said rollers, in opposite directions, to determine the extent of distortion to which said rule is subjected, substantially as set forth.

15. In a machine of the class described, the combination with a shaping-tool; means arranged to adjust said tool; feeding-rollers arranged to shift a printer's rule in operative relation with said tool; means carried by said rollers arranged to distort said rule by rolling grooves therein to increase its height; means arranged to adjust said rollers with respect to said rule; trimming-tools arranged to trim the bur formed by the rolling of said grooves; means arranged to adjust said trimming-tools with respect to said rule; and means to secure said trimming-tools in adjusted position, substantially as set forth.

16. In a machine of the class described, the combination with a shaping-tool; of feeding-rollers arranged to shift a printer's rule in operative relation with said tool; means carried by said rollers arranged to distort said rule by rolling grooves therein to increase its height; means comprising an overlying guide arranged to prevent the uplifting of said rule when entering beneath said tool; and means arranged to adjust said tool to determine the height of said rule, substantially as set forth.

17. In a machine of the class described, the combination with a shaping-tool; of means arranged to shift a printer's rule in operative relation with said tool; guides arranged to direct said rule in accurate alinement with said tool; shafts which are each provided with right and left hand threads arranged to engage corresponding threads in the respective guides to contemporaneously shift said guides in opposite directions to engage rules of different thickness, substantially as set forth.

In testimony whereof I have hereunto signed my name, at Philadelphia, Pennsylvania, this 5th day of July, 1905.

THOMAS F. DIXON.

Witnesses:
JAMES H. BELL,
E. L. FULLERTON.